(12) United States Patent
Park et al.

(10) Patent No.: US 10,252,674 B2
(45) Date of Patent: Apr. 9, 2019

(54) BLIND SPOT DETECTION MODULE (71) Applicant: LG INNOTEK CO., LTD., Seoul (KR)

(72) Inventors: Moo Ryong Park, Seoul (KR); Jin Hee Kim, Seoul (KR); Byoung Eon Lee, Seoul (KR); Hyun Duck Yang, Seoul (KR); Kwang Ho Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/653,141

(22) PCT Filed: Dec. 17, 2013

(86) PCT No.: PCT/KR2013/011691
§ 371 (c)(1),
(2) Date: Jun. 17, 2015

(87) PCT Pub. No.: WO2014/098432
PCT Pub. Date: Jun. 26, 2014

(65) Prior Publication Data
US 2015/0329047 A1 Nov. 19, 2015

(30) Foreign Application Priority Data

Dec. 17, 2012 (KR) .................. 10-2012-0147666
Dec. 18, 2012 (KR) .................. 10-2012-0148239

(51) Int. Cl.
*B60Q 1/00* (2006.01)
*B60R 1/12* (2006.01)
(Continued)

(52) U.S. Cl.
CPC .............. *B60R 1/12* (2013.01); *B60Q 9/008* (2013.01); *B60R 2001/1215* (2013.01);
(Continued)

(58) Field of Classification Search
CPC .............. B60R 1/12; B60R 2001/1215; B60R 2300/802; B60Q 9/008; F21S 2/00; G02B 6/0036; G02B 6/0041
(Continued)

(56) References Cited

U.S. PATENT DOCUMENTS 6,103,387 A * 8/2000 Yamamoto ............... C08K 5/00
427/387
8,600,656 B2 * 12/2013 Mimeault ............ B60Q 1/0023
340/435

(Continued)

FOREIGN PATENT DOCUMENTS

CN        102667550       9/2012
DE    10 2011 015103      9/2012
(Continued)

OTHER PUBLICATIONS

International Written Opinion dated Apr. 29, 2014 issued in Application No. PCT/KR2013/011691 (with English translation).
(Continued)

*Primary Examiner* — Kerri L McNally
*Assistant Examiner* — Thang D Tran
(74) *Attorney, Agent, or Firm* — KED & Associates LLP (57) ABSTRACT Provided is a blind spot detection module, including: a light source module linked with a sensor signal for detection of an object in an area behind a vehicle to emit light; and a reflector module including a warning optical pattern for transmitting light emitted from the light source module, wherein the light source module comprises a light guide member adopted to receive a light emitting element and to guide light to the reflector module.

12 Claims, 6 Drawing Sheets (51) Int. Cl.
*B60Q 9/00* (2006.01)
*F21V 8/00* (2006.01)

(52) U.S. Cl.
CPC ...... *B60R 2300/802* (2013.01); *G02B 6/0036* (2013.01); *G02B 6/0041* (2013.01)

(58) Field of Classification Search
USPC ................. 340/435, 10.1–10.6, 572.1–572.9
See application file for complete search history.

(56) References Cited

U.S. PATENT DOCUMENTS

| | | | |
|---|---|---|---|
| 2003/0137739 A1* | 7/2003 | Yoshida | G02B 5/0221 359/599 |
| 2004/0228106 A1* | 11/2004 | Stevenson | G02B 5/045 362/627 |
| 2005/0141243 A1* | 6/2005 | Mullen | B29C 35/0894 362/600 |
| 2005/0190082 A1* | 9/2005 | Kumata | B60R 1/00 340/995.1 |
| 2005/0195383 A1* | 9/2005 | Breed | B60N 2/002 356/4.01 |
| 2007/0058257 A1* | 3/2007 | Lynam | B60Q 1/2665 359/604 |
| 2007/0109804 A1 | 5/2007 | Pastrick et al. | |
| 2007/0252227 A1* | 11/2007 | Fukuda | H01L 27/14618 257/432 |
| 2008/0012697 A1 | 1/2008 | Smith et al. | |
| 2008/0212189 A1* | 9/2008 | Baur | B32B 17/10174 359/604 |
| 2009/0016068 A1 | 1/2009 | Chang | |
| 2009/0092366 A1* | 4/2009 | Iwasaki | G02B 6/0038 385/129 |
| 2009/0168421 A1* | 7/2009 | Ha | G02B 5/0215 362/245 |
| 2009/0316422 A1* | 12/2009 | Lynam | B60Q 1/2665 362/494 |
| 2010/0067257 A1* | 3/2010 | Meis | G02B 5/0841 362/624 |
| 2010/0182143 A1* | 7/2010 | Lynam | B60R 1/1207 340/465 |
| 2010/0296187 A1* | 11/2010 | Lynam | B60R 1/08 359/864 |
| 2011/0002028 A1* | 1/2011 | Luten | B60R 1/00 359/267 |
| 2011/0006316 A1 | 1/2011 | Ing et al. | |
| 2011/0074958 A1* | 3/2011 | Pastrick | B60Q 1/2665 348/148 |
| 2011/0141381 A1* | 6/2011 | Minikey, Jr. | B60R 1/088 349/11 |
| 2011/0280042 A1 | 11/2011 | Pance et al. | |
| 2011/0286202 A1* | 11/2011 | Kim | G02B 6/0055 362/97.1 |
| 2011/0310634 A1* | 12/2011 | Nagafuji | G02B 6/1221 362/610 |
| 2012/0026720 A1* | 2/2012 | Cho | G02B 5/0242 362/84 |
| 2012/0212676 A1* | 8/2012 | Kuromizu | G02F 1/133308 348/725 |
| 2013/0004726 A1* | 1/2013 | Park | B29C 33/42 428/172 |
| 2013/0223096 A1* | 8/2013 | Kim | G02B 6/0021 362/608 |
| 2013/0264538 A1* | 10/2013 | Oh | H01L 25/0753 257/13 |
| 2014/0022787 A1* | 1/2014 | Park | F21K 9/52 362/240 |
| 2014/0043854 A1* | 2/2014 | Yang | F21V 13/12 362/612 |
| 2014/0248458 A1* | 9/2014 | Sherman | C09J 9/00 428/41.8 |

FOREIGN PATENT DOCUMENTS

| | | |
|---|---|---|
| EP | 2 463 157 | 6/2012 |
| GB | 2 454 928 | 5/2009 |
| GB | 2 474 298 | 4/2011 |
| JP | 2009-289749 A | 12/2009 |
| KR | 10-2009-0027450 A | 3/2009 |
| KR | 10-2011-0077605 | 7/2011 |
| KR | 10-2011-0104398 | 9/2011 |
| WO | WO 2012/112536 | 8/2012 |

OTHER PUBLICATIONS

International Search Report dated Apr. 29, 2014 issued in Application No. PCT/KR2013/011691 (with English translation).
European Search Report dated Nov. 27, 2015 issued in Application No. 13866053.5.
Chinese Office Action dated Aug. 15, 2016 issued in Application No. 201380070804.2 (with English translation).
Korean Office Action dated Dec. 11, 2018 issued in Application No. 10-2012-0148239 (full Korean text).

* cited by examiner

BLIND SPOT DETECTION MODULE

CROSS-REFERENCE TO RELATED PATENT APPLICATIONS

This application is a U.S. National Stage Application under 35 U.S.C. § 371 of PCT Application No. PCT/KR2013/011691, filed Dec. 17, 2013, which claims priority to Korean Patent Application No. 10-2012-0147666, filed Dec. 17, 2012, and Korean Patent Application No. 10-2012-0148239, filed Dec. 18, 2012 whose entire disclosures are hereby incorporated by reference.

TECHNICAL FIELD

Embodiments of the present invention relate to a blind spot detection system, and more particularly, to a technology for implementing thinning, design efficiency, and the maximization of light efficiency of a blind spot detection module changing a monitoring area in blind spot according to each driving state of a vehicle.

BACKGROUND ART

In general, a blind spot detection system is a system intended to increase convenience of a driver by giving the driver a warning when an obstacle is found in the dead angle area of a rear side of a vehicle during driving, or when there is the risk of colliding with an obstruct in a blind zone upon the lane change of a vehicle or the risk of collision resulting from a lane change of another vehicle that approaches the vehicle at high speed from a rear side of left and right seats.

Figure 1:
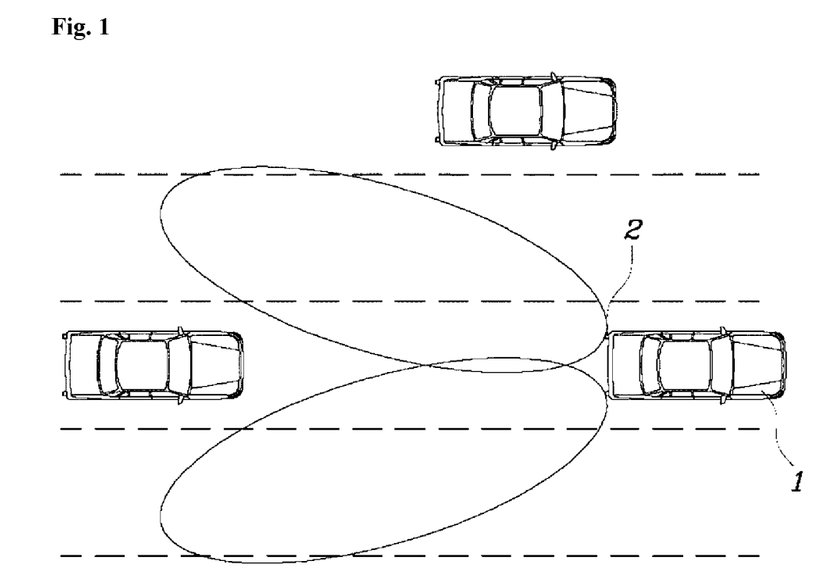
FIG. 1 is a schematic structure view of a blind spot detection system.

As illustrated in FIG. 1, the blind spot detection system has a sensor 2 installed at a rear side of a vehicle 1, wherein the sensor 2 detects a blind spot detection (BSD) zone, a lane change assist (LCA) zone, and a rear pre-crash (RPC) zone, and notifies drivers of approaching vehicles from these zones using a warning light.

Figure 2:
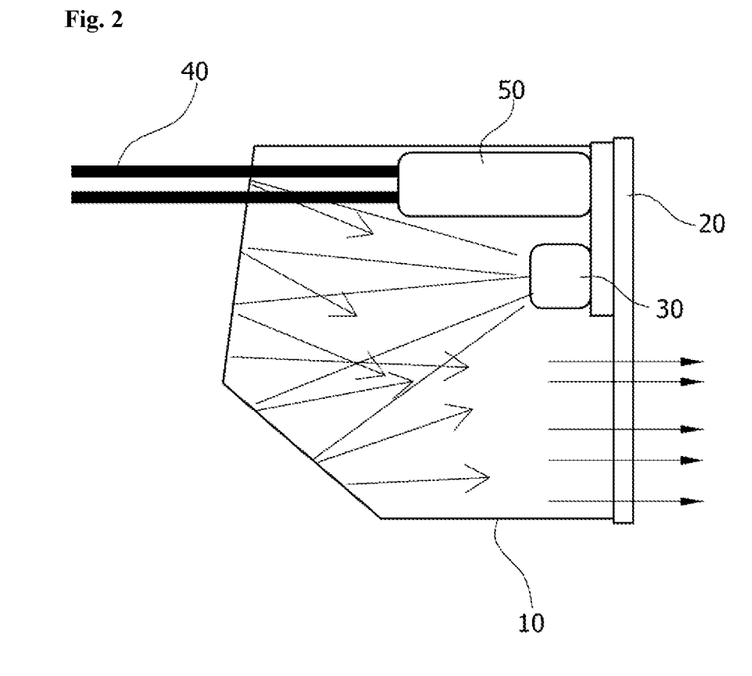
FIG. 2 is a conceptual view illustrating the subject matter of a warning module of the blind spot detection system.

As the structure of a rear cross-traffic warning light transmitting a warning signal from the sensor 2, the structure illustrated in FIG. 2 has been commercialized.

Referring to FIG. 2, when a detection signal is transmitted from the sensor via a wire 40, a warning signal is transmitted to a light source 30 formed in an inner portion of a reflective instrument 10 via a connector 50.

In this case, the structure is implemented such that, when light is emitted from the light source, the light reflected on a surface of the reflective instrument 10 penetrates an optical sheet 20 so that the warning signal can be transmitted to the outside by projection of a part of the light.

However, the structure as illustrated in FIG. 2 is mainly installed inside a side mirror of a vehicle, or a reflective mirror in an inner portion of the vehicle, and in this case, a space for receiving the reflective instrument 10 capable of securing reflection is needed. Thus, there are many limitations in forming a thickness of the entire instrument because such a space should be secured.

Moreover, when optical patterns are formed in an area where the light penetrates the optical sheet 20, merely reflection light is transmitted. Thus, since uniformity of the light cannot be secured, it is problematic in that uniform light may not be appropriately provided to the optical patterns.

In particular, it is problematic in that light efficiency is remarkably reduced because merely reflection light is implemented due to a very large inner space of the reflective instrument 20.

DISCLOSURE OF INVENTION

Technical Problem

Accordingly, the present invention has been made keeping in mind the above problems occurring in the related art. An aspect of the present invention provides a blind spot detection module of a vehicle which is configured such that a structure of a light source for applying light to a warning optical pattern formed in a reflective mirror is formed in a structure in which the light source emits light by applying a resin so that thinning of an instrument can be realized, and light efficiency can be maximized.

Moreover, in implementing a light source module applied to a blind spot detection module of a vehicle, a resin layer is used without a light guide plate so that light emitted from a light emitting unit can be guided to the outside, thereby making an entire thickness of the product thinner.

Furthermore, in implementing a light source module applied to a blind spot detection module of a vehicle, a light guide layer having protruding optical patterns is formed between a resin layer and a reflection member so that a three-dimensional geometrical effect can be implemented.

Solution to Problem

In order to solve the problem, according to an aspect of the present invention, a blind spot detection module may include: a light source module linked with a sensor signal for the detection of an object in blind zones behind a vehicle to emit light; and a reflector module including a warning optical pattern transmitting light emitted from the light source module, wherein the light source module includes a light guide member adopted to receive a light emitting element and to guide light to the reflector module.

Also, according to another aspect of the present invention, a light source module may include: a reflection member; at least one light emitting unit passing through the reflection member; a light guide member formed on the reflection member and the light emitting unit; and a light shielding pattern formed at an upper portion of the light guide member, wherein the reflection member and the light shielding pattern have the same color. In this case, the light source module may further include a light guide layer formed between the reflection member and the light guide member, and including protruding optical patterns that form a gap with the reflection member.

Advantageous Effects of Invention

According to an embodiment of the present invention, in a blind spot detection module, a structure of a light source for applying light to a warning optical pattern formed in a reflective mirror is formed in a structure in which the light source emits light by applying a resin so that thinning of an instrument can be realized, and light efficiency can be maximized.

In particular, thanks to flexibility of a resin material and thinning of a light guide structure, a design for utilizing a space can be diversified, and thanks to high light efficiency, luminance for enabling a warning optical pattern to be observed even in the daytime as well as at night can be implemented so that visibility can be improved. Also, since the number of light sources is reduced, very high luminance can be implemented compared to the number of light sources.

Also, according to another embodiment of the present invention, light is guided using a resin material having flexibility so that the number of light emitting packages can be reduced, an entire thickness of a surface lighting device can be thinner, and the degree of freedom in design of the product can be increased.

Furthermore, an optical pattern layer is formed in a light source module according to the present invention so that occurrence of the concentration of light and a hot spot can be prevented, the uniformity of light supplied to a diffusion plate can be improved, and luminance of a desired place can be adjusted by adjusting a path of light.

Also, since a reflection member and light shielding patterns are formed in the same color upon implementing a light source module according to still another embodiment of the present invention so that a lamp before emission can have a mirror-like shape, and a reflection sheet and a reflection pattern, which are structures capable of efficiently reflecting light emitted from a light emitting unit, are provided so that the reflectance of light can be improved, the improvement of luminous can be maximized, and a uniform surface light source can be provided.

Also, according to still another embodiment of the present invention, a light guide layer having protruding optical patterns is provided between a light guide member and a reflection member so that the shape and the three-dimensional effect of light can be changed according to each viewing angle, and an adhesive pattern is formed between the light guide layer and the reflection member so that the shape of geometrical optical patterns can be changed, a light source module having improved aesthetic sensibility can be provided, and application for various kinds of light source modules can be realized.

DESCRIPTION OF THE REFERENCE NUMERALS IN THE DRAWINGS

100: Light source
110: Printed circuit board
120: Reflection member
121: Reflection pattern
130: Light emitting unit (light source)
140: Light guide member
141: Light diffusion member (bead)
160: Optical pattern
161, 162: Optical sheet
200: Reflector module
210: Reflector
211: Warning optical pattern
220: Diffusion member
230: Spaced part
C: Reflective shielding module
G: Light guide layer
P1: Adhesive pattern
P2: Gap

BEST MODE FOR CARRYING OUT THE INVENTION

Hereinafter, the configurations and operations according to embodiments of the present invention will be described in detail with reference to the accompanying drawings. The present invention may, however, be embodied in different forms and should not be construed as limited to the embodiments set forth herein. In the explanation with reference to the accompanying drawings, regardless of reference numerals of the drawings, like numbers refer to like elements through the specification, and repeated explanation thereon is omitted. Terms such as a first term and a second term may be used for explaining various constitutive elements, but the constitutive elements should not be limited to these terms. These terms is used only for the purpose for distinguishing a constitutive element from other constitutive element.

The embodiments of the present invention relate to a blind spot detection module (i.e., Blind Spot Detection Display (BSD) or Side Blind Zone Display) which is a structure that functions to notify drivers of warning messages by emitting light for warning through a mirror (reflector) when detecting approaching vehicles from a blind zone or obstacles in a blind zone. In particular, in this case, a module capable of implementing light efficiency and thinning of an instrument may be provided.

1. First Embodiment

Figure 3:
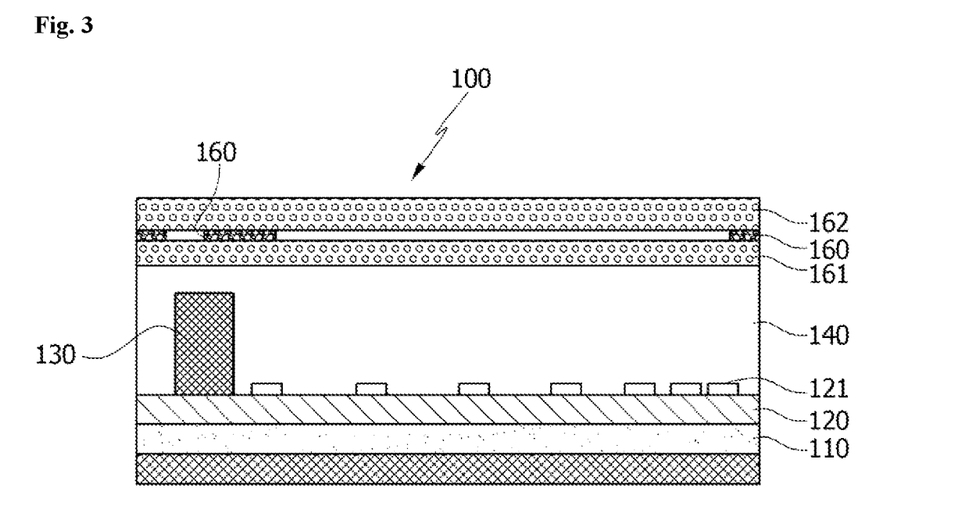
FIG. 3 is a conceptual view of a cross section illustrating the subject matter of a light source module of a blind spot detection module according to the present invention.
Figure 4:
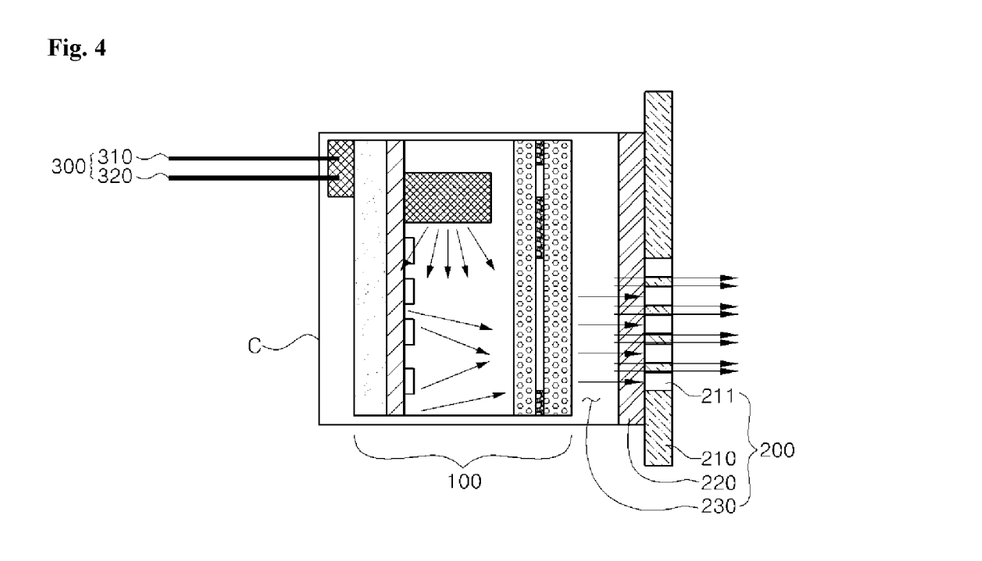
FIG. 4 is a conceptual view of a cross section illustrating a structure of the blind spot detection module according to the present invention including the light source module of FIG. 3.

FIG. 3 is a conceptual view of a cross section illustrating the subject matter of a light source module of a blind spot detection module according to the present invention, and FIG. 4 is a conceptual view of a cross section illustrating a structure of the blind spot detection module according to the present invention including the light source module of FIG. 3.

Referring to FIGS. 3 and 4, a blind spot detection module according to the present invention includes: a light source module 100 linked with a sensor signal for the detection of an object in a rear side area of a vehicle to emit light; and a reflector module 200 including a warning optical pattern 211 transmitting light emitted from the light source module 100.

In particular, the light source module 100 according to the present invention includes a light guide member 140 adopted to receive a light emitting element 130 and to guide light to the reflector module 200. In particular, the light guide member 140 may be made of a resin material directly attached to the light emitting element 130 so as to bury the light emitting element. The resin material is formed to be directly attached to the light emitting element 130, thereby enabling emitting light to be guided in an upward direction.

The light source 130 may be composed of a light emitting element package including a light emitting chip. The light guide member 140 laminated to bury the light source is configured to be closely attached to the light source 130 using the resin material so as to diffuse and disperse light. The light guide member may have flexibility and may be bent. Thanks to the flexibility, various portions in which a vehicle lamp is implemented may be easily modified to have bending so that generality for enabling the light source module to be applied to lighting having various purposes can be secured.

The resin material forming the light guide member 140 may be composed of a high heat resistance ultraviolet curable resin containing an oligomer. At this time, a content of the oligomer may range from 40 to 50 parts by weight with respect to the total weight of the ultraviolet curable resin. Also, urethane acrylate may be used as the ultraviolet curable resin without being limited thereto. In addition to this, at least one material of epoxy acrylate, polyester acrylate, polyether acrylate, polybutadiene acrylate, and silicon acrylate may be used as the ultraviolet curable resin.

In particular, when urethane acrylate is used as an oligomer, two types of urethane acrylate are used in a state of being mixed so that different physical properties can be simultaneously implemented.

For example, isocyanate is used during synthesizing urethane acrylate, and physical properties (a yellow index, weather resistance, chemical resistance, and the like) of the urethane acrylate are determined by the isocyanate. At this time, one kind of urethane acrylate is implemented using urethane acrylate type-isocyanate, and is implemented such that PDI (phenylene diisocyanate) or IPDI (isophorone diisocyanate) has an NCO content of 37% (hereinafter referred to as 'the first oligomer'). Another kind of urethane acrylate is implemented using urethane acrylate type-isocyanate, and is implemented such that PDI (phenylene diisocyanate) or IPDI (isophorone diisocyanate) has an NCO content of 30~50% or 25~35% (hereinafter referred to as 'the second oligomer'), so the oligomers according to each embodiment can be formed. The first oligomer and the second oligomer having different physical properties may be obtained by controlling the NCO content. By mixing the first and second oligomers, an oligomer forming the resin material may be implemented. At this time, a weight ratio of the first oligomer in the oligomer may range from 15 to 20, and a weight ratio of the second oligomer may range from 25 to 35.

Meanwhile, the resin material may further include at least one of a monomer and a photo initiator. At this time, a content of the monomer may range from 65 to 90 parts by weight. More specifically, the monomer may be composed of a mixture containing 35 to 45 parts by weight of an IBOA (Isobornyl Acrylate), 10~15 parts by weight of a 2-HEMA (2-Hydroxyethyl Methacrylate), and 15~20 parts by weight of a 2-HBA (2-Hydroxybutyl Acrylate). Moreover, in the case of the photo initiator (i.e., 1-hydroxycyclohexyl phenyl-ketone), diphenyl(2,4,6-trimethylbenzoyl phosphine oxide and the like), it may range from 0.5 to 1 parts by weight.

Also, the resin material may be composed of a thermosetting resin having high heat resistance. Specifically, the resin material may be composed of a thermosetting resin containing at least one of a polyester polyol resin, an acryl polyol resin, and a hydrocarbon or/and ester solvent. Such a thermosetting resin may further include a heat curing agent for increasing coating strength. In the case of the polyester polyol resin, a content of the polyester polyol resin may range from 9 to 30% compared to a total weight of the thermosetting resin. Also, in the case of the acryl polyol resin, a content of the acryl polyol may range from 20 to 40% compared to the total weight of the thermosetting resin.

In the case of the hydrocarbon or/and ester solvent, a content thereof may range from 30 to 70% compared to the total weight of the thermosetting resin. A content of the heat curing agent may range from 1 to 10% compared to the total weight of the thermosetting resin. When the resin material is formed of the materials described above, thermal resistance is increased. Thus, even though the resin material is used in a lighting device from which heat with a high temperature is emitted, a reduction of luminance due to the heat can be minimized, so a lighting device having high reliability can be provided.

As the materials described above are used, a thickness of the resin material can be remarkably reduced, so that the entire product can be thinner. Furthermore, according to the present invention, since a flexible printed circuit board may be applied as the printed circuit board for mounting the light source and in contact with the resin material, it can be easily applied to a curved surface so that the degree of freedom in design can be improved. Thus, it is advantageous in that the printed circuit board can be easily applied to vehicle lighting or flexible displays with various designs, and curves, and the like.

In particular, the resin material may contain a diffusion material having a hollow (or a pore) in an inner portion. The diffusion material may be mixed or diffused with resin forming the resin material, and may function to improve light reflection and diffusion properties. For example, light emitted from the light source to an inner portion of the resin material is reflected and penetrated by the hollow of the diffusion material so that the light can be diffused and condensed within the resin material, and the diffused and condensed light can be emitted to one surface (i.e., an upper surface) of the resin material. At this time, the reflectivity and diffusivity of light are increased by the diffusion material so that the amount and uniformity of emitted light can be improved, and as a result, luminance of the light source module can be increased.

A content of the diffusion material may be adjusted for obtaining a desired light diffusion effect. Specifically, the content of the diffusion material may be adjusted in the range of 0.01 to 0.3% compared to the total weight of the resin material, but is not limited thereto. The diffusion material 41 may be composed of any one selected from among silicon, silica, glass bubble, polymethyl methacrylate (PMMA), urethane, Zn, Zr, $Al_2O_3$, and acryl. A particle size of the diffusion material may range from 1 to 20 μm, but is not limited thereto.

Also, as illustrated in FIG. 2, a printed circuit board 110 may be a printed circuit board in which an insulating substrate having flexibility is used, namely, a flexible printed circuit board. In the present invention, even though an example in which the printed circuit board is composed of such a flexible printed circuit board is described, this is only one example. In addition to this, various types of substrates may be used as the printed circuit board according to the embodiment of the present invention.

A reflection member 120 may be disposed on an upper surface of the printed circuit board 110 so that light emitted from the light source while forming an inclination angle can be reflected and can be then transmitted upwards. Such a reflection member 120 may be implemented using any one of a transparent PET sheet, a white PET (Polyethylene terephthalate) sheet, and an Ag sheet. In particular, the reflection member may further include a reflection pattern 121 made of any one material of $TiO_2$, $CaCO_3$, $BaSO_4$, $Al_2O_3$, Silicon, and PS (Polystyrene) on a surface of the reflection member so that light efficiency can be maximized by reflecting a changed optical path.

The reflection pattern 121 has a structure in which a plurality of protruding patterns is provided. In order to increase a scattering effect of light, the reflection pattern may have a dot pattern form, a prism form, a lenticular form, a lens form or a combination form thereof, but is not limited thereto. A cross section of the reflection pattern 121 may have various shapes such as a triangular shape, a quadrangular shape, a semicircular shape, a sinusoidal shape, and the like.

Also, an optical pattern layer on which a plurality of optical patterns 160 is provided may be formed on an upper surface of the light guide member 140 of FIG. 3. The optical pattern layer may be implemented such that the plurality of optical patterns 160 are printed on a surface of one optical sheet, or as illustrated, the plurality of optical patterns are printed between a pair of optical sheets. In this case, the optical sheet may be made of a material having excellent light transmittance, for example, PET. The optical patterns 160 basically function to prevent light emitted from the light source 130 from being focused. That is, the optical patterns 160 along with the reflection pattern 121 may function to implement uniform surface emitting.

That is, in order to prevent an optical property from being reduced or a yellowish effect from being generated due to the excessive intensity of light, a part of the optical patterns 160 may be formed as light shielding patterns so as to implement a light shielding effect. The light shielding patterns may be printed on an upper surface of the light guide member 130 using a light shielding ink, or may be printed on the upper surface or a lower surface of the optical sheet.

The optical patterns 160 is implemented so as to function to partially shield and diffuse light rather than to completely shield the light, so that a light shielding level and diffusivity can be adjusted by one optical pattern. Furthermore, more specifically, the optical patterns according to the present invention may be implemented in an overlapping print structure of composite patterns. The overlapping print structure refers to a structure in which one pattern form is formed, and another pattern form is printed thereon. As one example, in implementing the optical patterns 160, each of the optical patterns may be implemented in an overlapping structure of a diffusion pattern and a light shielding pattern wherein the diffusion pattern is formed on a lower surface of a polymeric film in a light emitting direction using a light shielding ink containing at least one material selected from among $TiO_2$, $CaCO_3$, $BaSO_4$, $Al_2O_3$, and Silicon, and the light shielding pattern is formed using a light shielding ink containing Al, or a mixture material of Al and $TiO_2$.

That is, the diffusion pattern is white-printed on the surface of the polymer film, and thereafter, the light shielding pattern is formed thereon. Also, the optical patterns may be formed in a double structure in a reverse order. Of course, it is obvious that such a design for forming these patterns may be variously changed in consideration of the efficiency, intensity, and shielding rate of light. Also, the structure of the optical patterns may be formed in a triple structure which is configured such that, in a sequential layer structure, the light shielding pattern corresponding to a metal pattern is formed in a middle layer, and the diffusion pattern is formed at an upper portion and a lower portion thereof. In such a triple structure, the materials described above may be used. As one preferred example, through the triple structure which is configured such that one of the diffusion patterns is implemented using TiO2 having an excellent refractive index, another of the diffusion pattern is implemented using both $CaCO_3$ and $TiO_2$ having excellent light stability and color sensitivity, and the light shielding patterns are implemented using Al having an excellent concealing property, light efficiency and uniformity can be secured. In particular, since $CaCO_3$ functions to reduce the exposure of yellowish light, it enables white light to be finally implemented so that light having more stable efficiency can be implemented. In addition to $CaCO_3$, inorganic materials having a large particle size, such as $BaSO_4$, $Al_2O_3$, Silicon beads, and the like, may be also utilized. Moreover, in terms of light efficiency, the optical patterns 160 may be formed by adjusting a pattern density such that the pattern density is reduced as the optical patterns are gradually far away from a light emitting direction of the LED light source.

The light source module according to FIG. 3 is implemented as a blind spot detection module according to the present invention by being combined with a reflector module 200 as illustrated in FIG. 4.

Referring to FIGS. 3 and 4, the light source module 100 is received in an inner portion of the reflective shielding module C, which is a reflective instrument serving as a housing. In the present embodiment, a case in which the light source module is received in a lengthwise direction is described as one example. The reflective shielding module C is formed to have a sealing structure at an opening region, as well as receiving the light source 100 therein.

The reflective shielding module C may be made of a material containing any one of Al, PC, PP, ABS, and PBT, and may function to reflect leaked light and to transmit it in a reflector module direction and may also perform the function of a housing structure of an entire instrument.

In particular, light emitted from the light source module 100 according to the present invention is emitted from an inner portion of the light guide member 140 made of the resin material to a reflector through a reflex action by the reflection member 120 and the reflection pattern 121. The emitted light penetrates the optical pattern layer and is then transmitted to a reflector 210 disposed to have a fixed spaced part 230. After this, the light is emitted, as a mark or an image for warning, on a surface of the reflector while passing through the warning optical pattern formed in a partial region of the reflector 210 so that a warning signal can be notified to a user. The warning optical pattern 211 may be a pattern layer formed to pass through the reflector 210, a transparent layer, a pattern layer by which colors are implemented, or the like, so that light having various warning patterns can be emitted.

In this case, the reflector module 200 may include: the reflector 210 disposed at a position corresponding to a light emitting surface of the light guide member 140; and a diffusion member 220 formed on a surface of the reflector. The diffusion member 220 may be formed with an optical sheet so as to perform a light reflection or shielding function. In general, the diffusion member 220 may be generally formed of acryl resin, but is not limited thereto. In addition to this, the diffusion member may be made all materials for enabling a diffusion function, namely, high transmission plastic, such as PS (Polystyrene), PMMA (Polymethyl Methacrylate), a COC (Cyclic Olefin Polymer), PET (Polyethylene Terephthalate), and resin.

Also, a spaced part 230 is formed between the reflector module 200 and the light source module 100 so that the uniformity of transmitted light can be increased, and reflection light can be also guided from the reflective shielding module C, thereby enabling the luminance of light to be maximized. Thanks to presence of the space part 230, a difference in refractive indexes between optical paths may be generated so that uniformity of light supplied to the diffusion member 200 can be increased. As a result, the uniformity of light diffused and emitted through the diffusion member can be increased. At this time, in order to minimize optical deviation, a thickness of a second spaced part A may be formed in the range of more than 0 and less than 30, but is not limited thereto. According to the need, the thickness may be designed and changed.

In the blind spot detection module according to the present invention, the resin material is used as a member having a light guiding function so that a sliming form of the entire light module can be realized. Furthermore, by using directly emitted light, as well as reflected light, an optical path may be adjusted so that the warning optical pattern can be emitted, and light having high efficiency can be implemented even by a small number of light sources.

2. Second Embodiment

Figure 5:
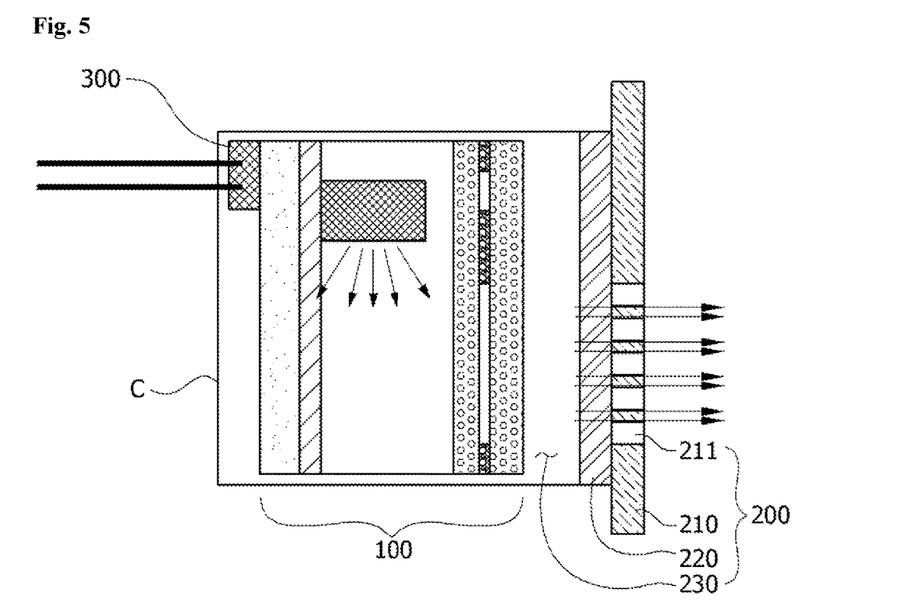
FIGS. 5 to 7 illustrate modified embodiments in which the structure of FIG. 4 is modified.
Figure 6:
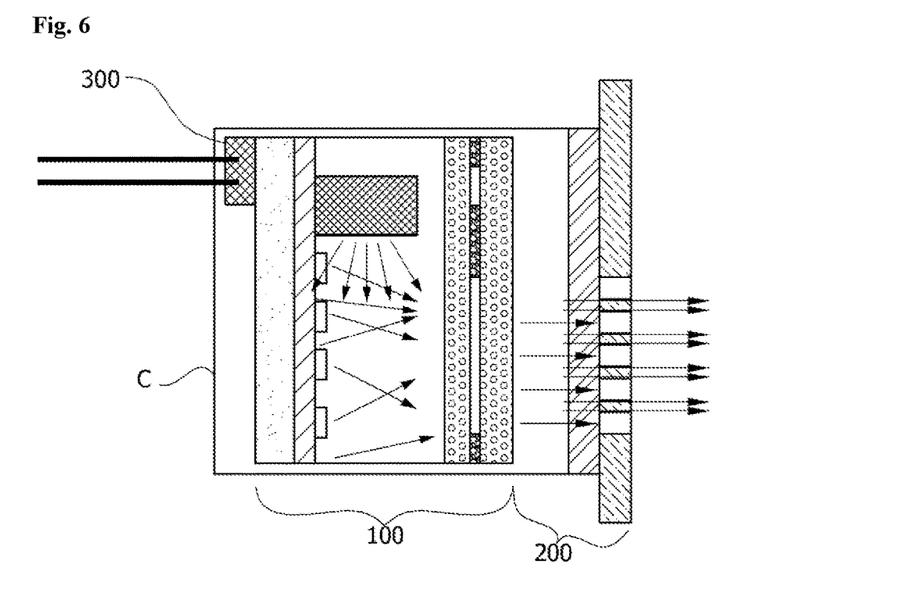
Figure 7:
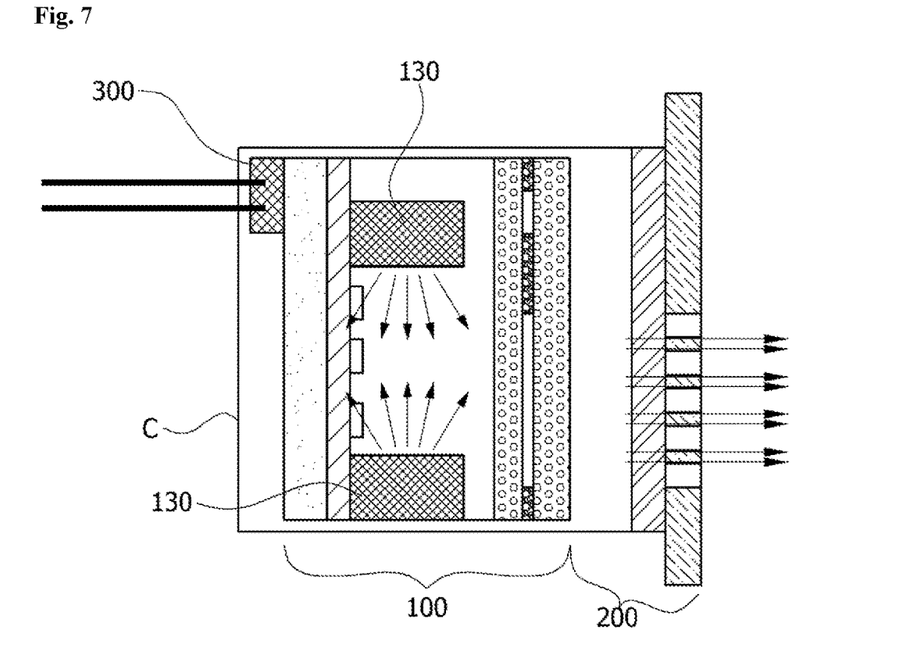

FIGS. 5 to 7 illustrate modified embodiments in which the structure of FIG. 4 is modified.

The structure of the blind spot detection module illustrated in FIG. 5 is implemented such that the reflection pattern 121 in the light source module is omitted from the configuration of the blind spot detection module according to the embodiment of the present invention of FIG. 4. In the structure, a thickness of the resin material layer may be adjusted, and illustrated optical pattern layers may be also removed according to circumstances so that luminance can be improved.

Furthermore, the structure of the blind spot detection module illustrated in FIG. 6 may be implemented such that the diffusion member 210 of the reflector module 200 is removed from the structures of FIGS. 3 and 4. In the structure, the reflection pattern in the light source module is visible from the warning optical pattern 211 in the reflector. Thus, the structure of FIG. 6 may be implemented so that appearance having various shapes can be realized.

With regard to the structures of FIGS. 3 and 4 or the structures of FIGS. 5 and 6, since the number of light sources and an arrangement structure of a light emitting array may be adjusted, FIG. 7 illustrates a structure of the blind spot detection module in which luminous may be simply adjusted in a desired degree.

In order to implement an entire warning system, the blind spot detection module according to the present invention illustrated in FIGS. 2 to 7 may further include: a sensor part adopted to sense an object in an area behind a vehicle; and a control part adopted to control light emission of the light source module. In the structure of FIG. 2, it is preferable to further include a signal transmitting module 300 adopted to transmit a control signal of the control part to the printed circuit board via wires 310, 320.

3. Third Embodiment

Hereinafter, the other embodiment in which the structure of the light source module applied to the first and second embodiments is modified will be described.

Even though the third embodiment is similar to the first and second embodiments with respect to the basic structure of the light source module for implementing surface light emission, the light source module applied to the third embodiment may implement a mirror effect by forming a reflection member and optical patterns included in the light source module in the same color. Furthermore, a light guide layer composed of a light guide member and having protruding optical patterns is formed between the light guide member and the reflection member, so that the light source module capable of implementing a three-dimensional geometric effect has been suggested.

Referring to FIG. 4, the light source module according to the present invention may further include: a printed circuit board 110; at least one light emitting unit formed on the printed circuit board 110; a reflection member 120 formed on the printed circuit board 110 to pass through the light emitting unit 130; the light guide member adopted to bury the light emitting unit 130 and to guide emitted light to the front; a first optical sheet 170 formed on an upper surface of the light guide member 140; a second optical sheet 190 formed on the first optical sheet 170; and an optical pattern 183 formed on an upper surface of the first optical sheet 170 or a lower surface of the second optical sheet 190, and having the same color as that of the reflection member 120.

The printed circuit board 110 means a board in which a circuit pattern is formed on a substrate, namely, a printed circuit board. In particular, in the present invention, in order to secure certain flexibility, the printed circuit board may be formed as a flexible printed circuit board (FPCB).

The light emitting unit 130 is a part in which at least one light source is arranged on the printed circuit board 110 to emit light. The light emitting unit 130 according to the embodiment of the present invention may be composed of a side view type light emitting diode. That is, the light emitting diode having a structure in which light is emitted toward a side rather than being straightly emitted upwards may be used as the light emitting unit 130 of the present invention. Accordingly, since the light source module according to the embodiment of the present invention is configured such that the light emitting unit 130 composed of the side view type light emitting diode is disposed in a direct type, the light guide member capable of implementing a light diffusion and reflection function is utilized for diffusing and guiding light in a upward direction, so that the number of light sources can be reduced and an entire weight and thickness of the light source module can be remarkably reduced.

As one detailed example, the light guide member 140 corresponds to that of each of the first and second embodiments, and is formed at an upper portion of the reflection member 120 and the light emitting unit 130. The light guide member 140 functions to diffuse or guide light emitted from the light emitting unit 130 forwards. That is, the light guide member 140 is configured to bury the light emitting unit 130, thereby functioning to disperse the lighting emitted from the light emitting unit 130 in a side direction. That is, a function of the conventional light guide plate may be performed by the light guide member 140.

The light guide member 140 according to the present embodiment of the invention may be generally made of resin for enabling the diffusion of light. For example, the light guide member 140 according to the present embodiment of the invention may be made of a resin material. In this case, the resin material may be composed of an ultraviolet curable resin containing an oligomer. More specifically, the light guide member 140 may be made of a resin having a urethane acrylate oligomer as a main raw material. For example, a resin in which the urethane acrylate oligomer corresponding to a synthetic oligomer and a polyacrylic polymer are mixed may be used. Of course, the light guide member may further contain a monomer in which IBOA (isobornyl acrylate), HPA (hydroxylpropyl acrylate), 2-HEA (2-hydroxyethyl acrylate) and the like are mixed, the monomer corresponding to a low boiling point and diluted type reactive monomer. Also, a photo initiator (1-hydroxycyclohexyl phenyl-ketone and the like) or an antioxidant may be mixed as an additive. However, the foregoing is only one example. In addition to these materials, the light guide member 140 according to the embodiment of the present invention may be formed using all resin materials capable of performing a light diffusing function, which have been developed and commercialized, or can be implemented according to technical development in the future.

According to the embodiment of the present invention, thanks to presence of the light guide member 140, a thickness occupied by the conventional light guide plate may be remarkably reduced so that thinning of the entire production can be realized. Furthermore, since the light guide member has a flexible material, it is advantageous in that the light guide member can be easily applied to a curved surface, the degree of freedom in design can be increased, and the light guide member can be also applied to other flexible displays.

The reflection member 120 is formed on an upper surface of the printed circuit board 110, and is configured such that the light emitting unit 130 passes through the reflection member. The reflection member 120 according to the embodiment of the present invention is made of a material having high reflection efficiency so as to function to reduce light loss by reflecting the light emitted from the light upwards. The reflection member 120 may have a film form and may be formed using a synthetic resin dispersively containing a white pigment in order to implement a reflection property and dispersion property of light. For example, examples of the white pigment may include, not being limited to, titanium dioxide, aluminum oxide, zinc oxide, lead carbonate, barium sulfate, calcium carbonate, and the like. Examples of the synthetic resin may include, not being limited to, polyethylene terephthalate, polyethylene naphthalate, acrylic resin, polycarbonate, polystyrene, polyolefin, cellulose acetate, weather resistant vinyl chloride, and the like.

However, in the present invention, in order to implement a mirror effect in which optical patterns 183 to be described later are not observed when light is not on, the reflection member 120 and the optical patterns may have the same color. At this time, the reflection member may be composed of Ag. A reflectance may range from 80 to 100%. Also, the reflection member 120 may be white or may have a metallic color in order to implement a mirror effect. More specifically, the metallic color may be silver.

Even though it is illustrated that the optical patterns 183 are formed on a lower surface of the second optical sheet 190, the optical patterns may be also formed on an upper surface of the first optical sheet 170. The optical patterns 183 may be intended to prevent the concentration of light emitted from the light emitting unit 130 and to control hot spots, and may be aligned to be formed at an upper portion of the light emitting unit 130.

The first optical sheet 170 and the second optical sheet 190 may be made of a material having excellent light transmittance. As one example, PET may be used.

The optical patterns 183 may be implemented such that a shielding degree and diffusivity of light are adjusted by one optical pattern so that the optical patterns can function to partially shield and diffuse the light rather than functioning to completely block the light. Furthermore, more specifically, the optical patterns 183 according to the present invention may be implemented in an overlapping print structure of composite patterns. The overlapping print structure refers to a structure in which one pattern form is formed, and another pattern form is printed thereon.

At this time, the optical patterns 183 may have the same color as that of the reflection member 120, more specifically, a white color or a metallic color so that a mirror effect can be implemented when light is not on. In particular, when the reflection member 120 is made of an Ag material, the optical patterns 183 may be also made of the same material as that of the reflection member, namely, the Ag material. Even though the material of the optical patterns is not identical to that of the reflection member, it is preferable that the material have reflectance similar to that of the material of the reflection member 120. More specifically, when the reflection member 120 made of Ag has a reflectance of 80 to 100%, the optical patterns made of Al may have a reflectance of 75 to 95%. Accordingly, the optical patterns may have an Ag or Al color as a metallic color.

Also, even though it is not illustrated, at least optical sheet may be further formed on the second optical sheet 190 as needed.

Figure 8:
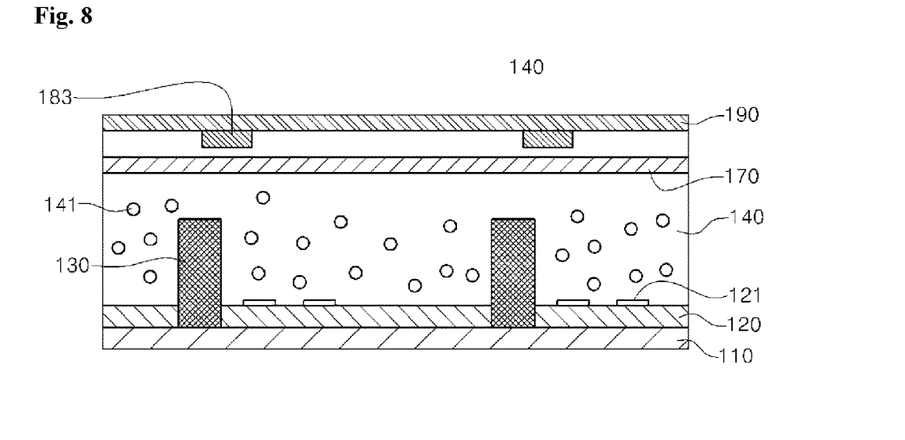
FIG. 8 illustrates a structure in which a reflective pattern and a light diffusing material applied to a light source module according to the other embodiment of the present invention are added.

FIG. 8 illustrates a structure in which the reflection pattern and the light diffusion member are added to the light source module according to the other embodiment of the present invention.

Referring to FIG. 8, the light guide member 140 according to the embodiment of the present invention may further include a plurality of light diffusion members (beads) 141 each having a hollow (or a pore) in an inner portion thereof in a mixed or diffused form. The light diffusion members 141 function to increase a light reflection and diffusion property.

For example, in a case where each of the light diffusion members 141 is implemented in a bead form in which a hollow is formed, when the light emitted from the light emitting unit 130 is incident to the light diffusion members 141 inside the light guide member 140, the light is reflected and transmitted by the hollow of each of the light diffusion members 141, and the light is then diffused and concentrated, thereby being emitted upwards. At this time, reflectance and diffusivity of the light are increased by the light diffusion members 141 so that an amount and uniformity of emitted light supplied in an upwards direction later can be increased, and as a result, luminous of the light source module can be improved.

A content of the light diffusion members 141 (beads) may be appropriately adjusted in order to obtain a desired light diffusion effect, more specifically, may be adjusted in the range of 0.01 to 0.3% compared to a total weight of the light guide member 140, but is not limited thereto. That is, the light emitted from the light emitting unit 130 in a side direction is diffused and reflected through the light guide member 140 and the light diffusion members 141, thereby traveling in an upwards direction. The light diffusion members 141 may be made of any one selected from among silicon, silica, glass bubble, PMMA (Polymethyl Methacrylate), urethane, Zn, Zr, $Al_2O_3$, and acryl. A particle size of the light diffusion members 141 may range 1 to 20 μm, but is not limited thereto.

The light source module according to the embodiment of the present invention may further include the reflection patterns 121 formed on a surface of the reflection member 120. The reflection pattern 121 functions to scatter and disperse incident light and to uniformly transmit the light upwards. The reflection pattern 121 may be formed by printing the surface of the reflection member 120 using a reflective ink containing any one of $TiO_2$, $CaCO_3$, $BaSO_4$, $Al_2O_3$, Silicon, and PS (Polystyrene) without being limited thereto. The structure of the reflection pattern 121 may be configured such that a plurality of protruding patterns are provided, and may have a dot pattern form, a prism form, a lenticular form, a lens form or a combination form thereof in order to increase a scattering effect of light, the reflection pattern may have a dot pattern form, a prism form, a lenticular form, a lens form or a combination form thereof, but is not limited thereto. A cross section of the reflection pattern 121 may have various shapes such as a triangular shape, a quadrangular shape, a semicircular shape, a sinusoidal shape, and the like.

Figure 9:
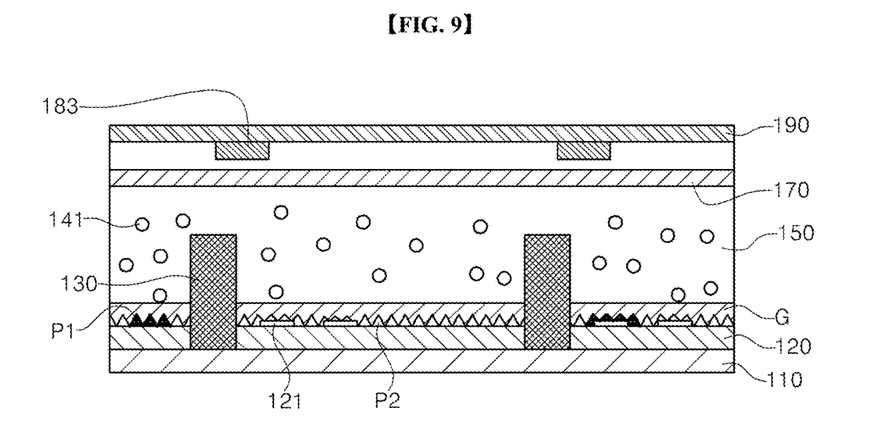
FIG. 9 illustrates a structure in which a light guide layer is added to the light source module according to the other embodiment of the present invention illustrated in FIG. 8.

FIG. 9 illustrates a structure in which a light guide layer is added to the light source module according to the embodiment of the present invention.

Referring to FIGS. 8 and 9, the light source module according to the present invention may further include a light guide layer G formed between the reflection member 120 and the light guide member 140, and having protruding optical patterns formed on a surface toward the reflection member 120. Even though a case in which the light guide layer is added to the structure illustrated in FIG. 8 will be hereinafter described, this case is only one example. The light guide layer may be added to the light source module illustrated in FIG. 3 which is a structure in which the reflection pattern and the light diffusion members are not provided.

At this time, the light guide layer G may be composed of any one of a prism sheet having a plurality of unit prism lens patterns, a micro lens array sheet, and a lenticular lens sheet, or a combination thereof. As can be seen from the drawings, a gap P2 (an air layer) is formed between the light guide layer G and the reflection member 120 due to the protruding optical patterns, or an adhesive pattern P1 in a shape corresponding to that of the protruding optical patterns is formed, thereby adhering the light guide player L and the reflection member 120. No gap P2 is formed at a portion in which the adhesive pattern is formed. As such, since the light guide layer G composed of a prism sheet and the like having the protruding optical patterns rather than a simple surface light emission form is provided, geometrical optical patterns are formed so that the shape and three-dimensional effect of light can be changed according to each viewing angle. At this time, when the reflection pattern 121 using a reflective ink is formed on the reflection member 120, the intensity of light can be adjusted, and the shape of geometrical optical patterns can be modified by using the adhesive pattern P1 between the reflection member 120 and the light guide layer G.

Figure 10:
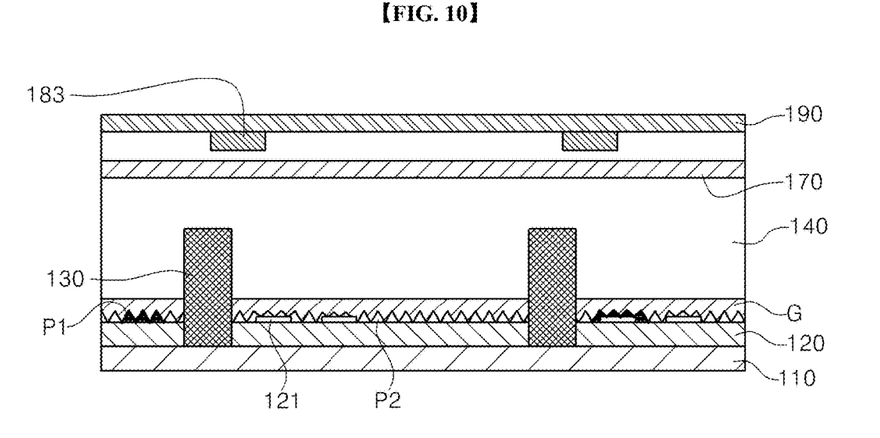
FIG. 10 illustrates a structure in which a light diffusion member is not included in the light source module according to the other embodiment of the present invention illustrated in FIG. 9.

FIG. 10 illustrates a structure in which the light diffusion members are removed from the light source module according to the embodiment of the present invention illustrated in FIG. 9. Even though the structure is a structure in which the light diffusion members are not included in the light guide member, the mirror effect and the geometrical light shape according to the present invention as described above can be implemented.

Figure 11:
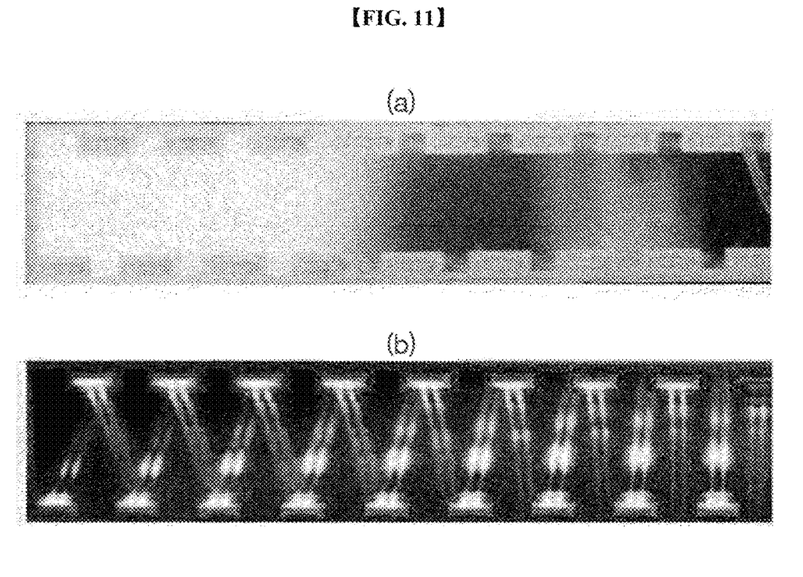
FIG. 11 illustrates images of the light source module according to the other embodiment of the present invention before and after actual operation.

FIG. 11 illustrates images of the light source module according to the other embodiment of the present invention before and after actual operation.

Referring to FIG. 11, as can be seen from the image (A) of the light source module before light emission of the light emitting unit, since the reflection member and the optical patterns have the same color, the optical patterns are not easily visible, and have a mirror-like shape. Through the image (B) of the light source module after light emission of the light emitting unit, it can be seen that, thanks to the light guide layer having the protruding optical patterns, the distribution of light having a three-dimensional effect is implemented by concentration of the light.

As described above, the blind spot detection module according to the present invention to which the light source module having flexibility thanks to application of the resin material is applied can make entire equipment thinner, can maximize light efficiency, and can obtain luminous for enabling a warning optical pattern to be observed even in the daytime by showing maximum light efficiency with the minimum number of light sources. Also, the blind spot detection module according to the present invention can secure the uniformity of light, can solve the problems generated upon applying LEDs, such as dark spots, hot spots, and the like, and can provide convenience for enabling luminous a desired place to be adjusted by adjusting a path of light.

As previously described, in the detailed description of the invention, having described the detailed exemplary embodiments of the invention, it should be apparent that modifications and variations can be made by persons skilled without deviating from the spirit or scope of the invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims and their equivalents.

What is claimed is:

1. A blind spot detection module, comprising:
a light source module configured to emit light based on a sensor signal indicating detection of an object; and
a reflector module provided on the light source module and including a warning optical pattern to transmit light emitted from the light source module,
wherein the light source module includes:
a light emitting element provided on a printed circuit board and including a light emitting diode of a side view type;
a light guide member that covers a top surface and side surfaces of the light emitting element;
a reflection member provided between the printed circuit board and the light guide member and reflecting the light emitted from the light emitting element toward the reflector module;
a light guide layer provided between the light guide member and the reflection member; and
an optical pattern layer including first optical patterns provided between a first optical sheet and a second optical sheet, wherein the first optical patterns are configured to partially cover the light emitting element to shield light, and the first optical sheet is directly provided on the light guide member,
wherein the light guide layer has a first surface that contacts the light guide member and a second surface opposite to the first surface, the reflection member having a first surface that faces toward the light guide layer and a second surface opposite to the first surface of the reflection member,
the light guide layer includes a plurality of optical patterns that protrude from the second surface of the light guide layer toward the reflection member, and the light emitting element passes through the light guide layer by extending through the first surface and the second surface of the light guide layer, wherein an adhesive pattern is provided between the first surface of the reflection member and the second surface of the light guide layer at areas between separate ones of the plurality of optical patterns, the adhesive pattern being in a shape that corresponds to areas between separate ones of the plurality of optical patterns to adhere the light guide layer to the reflection member, wherein a plurality of air gaps are formed between the second surface of the light guide layer and the first surface of the reflection member due to the plurality of optical patterns and no air gap is formed at a portion at which the adhesive pattern is provided, and wherein the reflector module includes:
a reflector provided at a position that corresponds to a light emitting surface of the light guide member; and
a diffusion member provided on a bottom surface of the reflector, the diffusion member being spaced apart from the optical pattern layer to form a space.

2. The blind spot detection module of claim 1, wherein each of the first optical patterns is formed in an overlapping structure of a diffusion pattern and a light shielding pattern, the diffusion pattern being formed using a light shielding ink containing at least one material selected from among $TiO_2$, $CaCO_3$, $BaSO_4$, $Al_2O_3$, and Silicon, and the light shielding pattern being formed using a light shielding ink containing Al, or a mixture material of Al and $TiO_2$.

3. The blind spot detection module of claim 1,
wherein the light guide member is made of a resin material to completely cover the light emitting element,
wherein the resin material is composed of an ultraviolet curable resin containing at least one of urethane acrylate, epoxy acrylate, polyester acrylate, polyether acrylate, polybutadiene acrylate, and silicon acrylate.

4. The blind spot detection module of claim 3, wherein the resin material further contains a diffusion material intended for diffusing light and composed of any one selected from among silicon, silica, glass bubble, polymethyl methacrylate (PMMA), urethane, Zn, Zr, Al2O3, and acryl.

5. The blind spot detection module of claim 1, wherein the reflection member includes a reflection pattern made of any one material of $TiO_2$, $CaCO_3$, $BaSO_4$, $Al_2O_3$, Silicon, and PS (Polystyrene) provided on a surface of the reflection member that faces the plurality of optical patterns of the light guide layer.

6. The blind spot detection module of claim 5, wherein the reflection member is any one of a transparent PET (polyethylene terephthalate) sheet, a white PET (polyethylene terephthalate) sheet, and an Ag sheet.

7. The blind spot detection module of claim 1, further comprising a reflective shielding module having an opening area in a light emitting surface direction and adopted to receive the light source module.

8. The blind spot detection module of claim 7, wherein the reflective shielding module is made of a material containing any one of Al, PC, PP, ABS, and PBT.

9. The blind spot detection module of claim 7, wherein the reflector module is provided to cover the opening area of the reflective shielding module.

10. The blind spot detection module of claim 8, further comprising: a sensor part adopted to sense an object in an area behind a vehicle; and a control part adopted to receive a signal of the sensor part and to control light emission of the light source module.

11. The blind spot detection module of claim 1, wherein the reflection member and the light shielding pattern have the same color.

12. A warning system for a vehicle including a blind spot detection module, wherein the blind spot detection module includes:
a sensor part adopted to sense an object in vehicle prescribed region;
a control part adopted to receive a signal of the sensor part and to control a light emitting signal;
a light source module implemented with a light emitting element that emits light according to a control signal of the control part, and a resin material that guides light; and
a reflector module spaced apart from the light source module and including a warning optical pattern through which emitted light passes,
wherein the light source module includes:
a light emitting element provided on a printed circuit board and including a light emitting diode of a side view type;
a light guide member that covers a top surface and side surfaces of the light emitting element;
a reflection member provided between the printed circuit board and the light guide member and reflecting the light emitted from the light emitting element toward the reflector module;
a light guide layer provided between the light guide member and the reflection member; and
an optical pattern layer including first optical patterns provided between a first optical sheet and a second optical sheet, wherein the first optical patterns are configured to at least partially cover the light emitting element to shield a light, and the first optical sheet is directly provided on the light guide member,
wherein the light guide layer has a first surface that contacts the light guide member and a second surface opposite to the first surface, the reflection member having a first surface that faces toward the light guide layer and a second surface opposite to the first surface of the reflection member,
the light guide layer includes a plurality of optical patterns that protrude from the second surface of the light guide layer toward the reflection member, and the light emitting element passes through the light guide layer by extending through the first surface and the second surface of the light guide layer,
wherein an adhesive pattern is provided between the first surface of the reflection member and the second surface of the light guide layer at areas between separate ones of the plurality of optical patterns, the adhesive pattern being in a shape that corresponds to areas between separate ones of the plurality of optical patterns to adhere the light guide layer to the reflection member,
wherein a plurality of air gaps are formed between the second surface of the light guide layer and the first surface of the reflection member due to the plurality of optical patterns and no air gap is formed at a portion at which the adhesive pattern is provided,
wherein the reflector module includes:
a reflector provided at a position that corresponds to a light emitting surface of the light guide member; and
a diffusion member provided on a bottom surface of the reflector, the diffusion member being spaced apart from the optical pattern layer to form a space.

* * * * *